(No Model.) 3 Sheets—Sheet 3.
C. D. & H. F. CRICKLER.
APPARATUS FOR MOLDING BOTTLES.

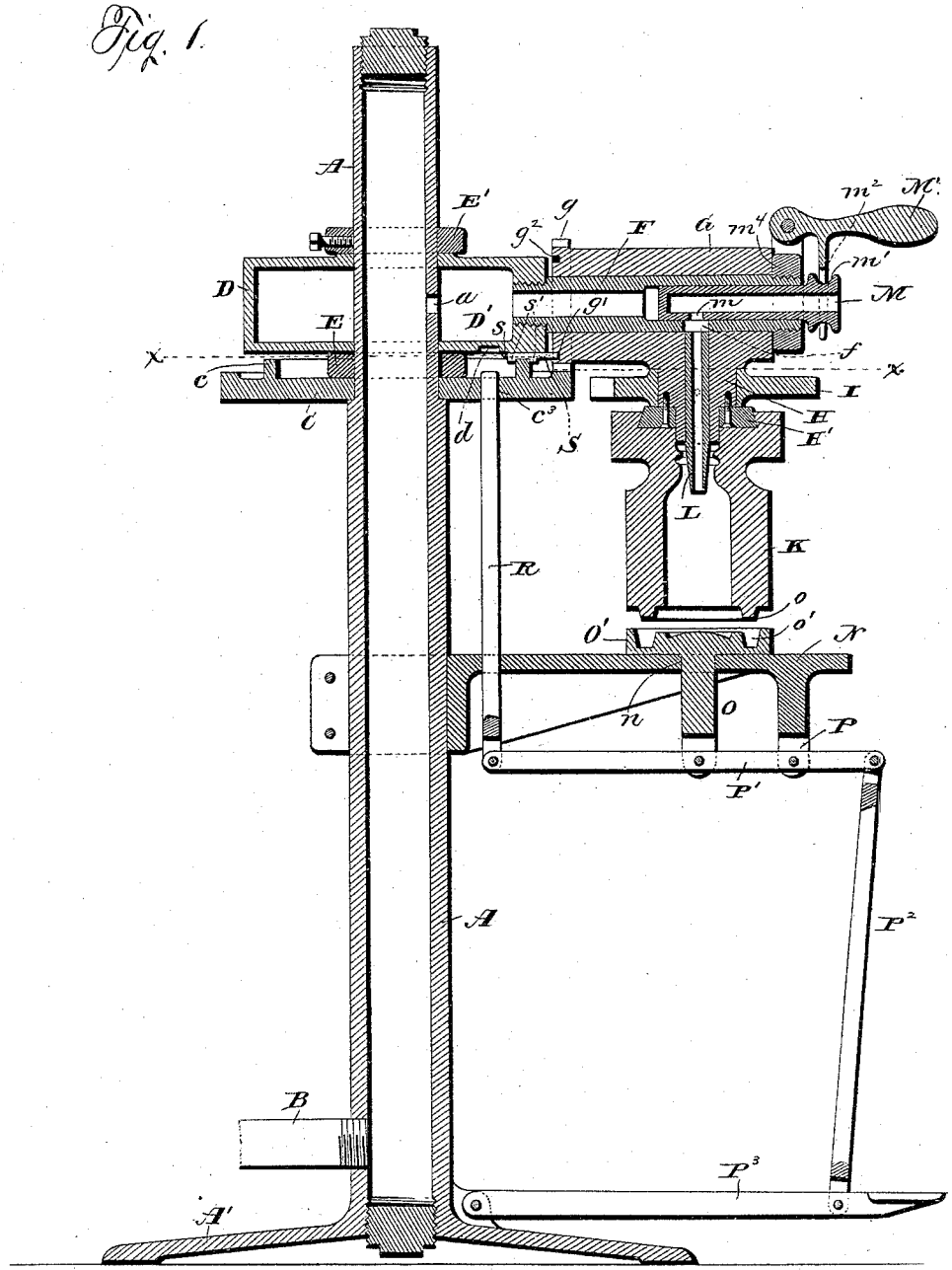

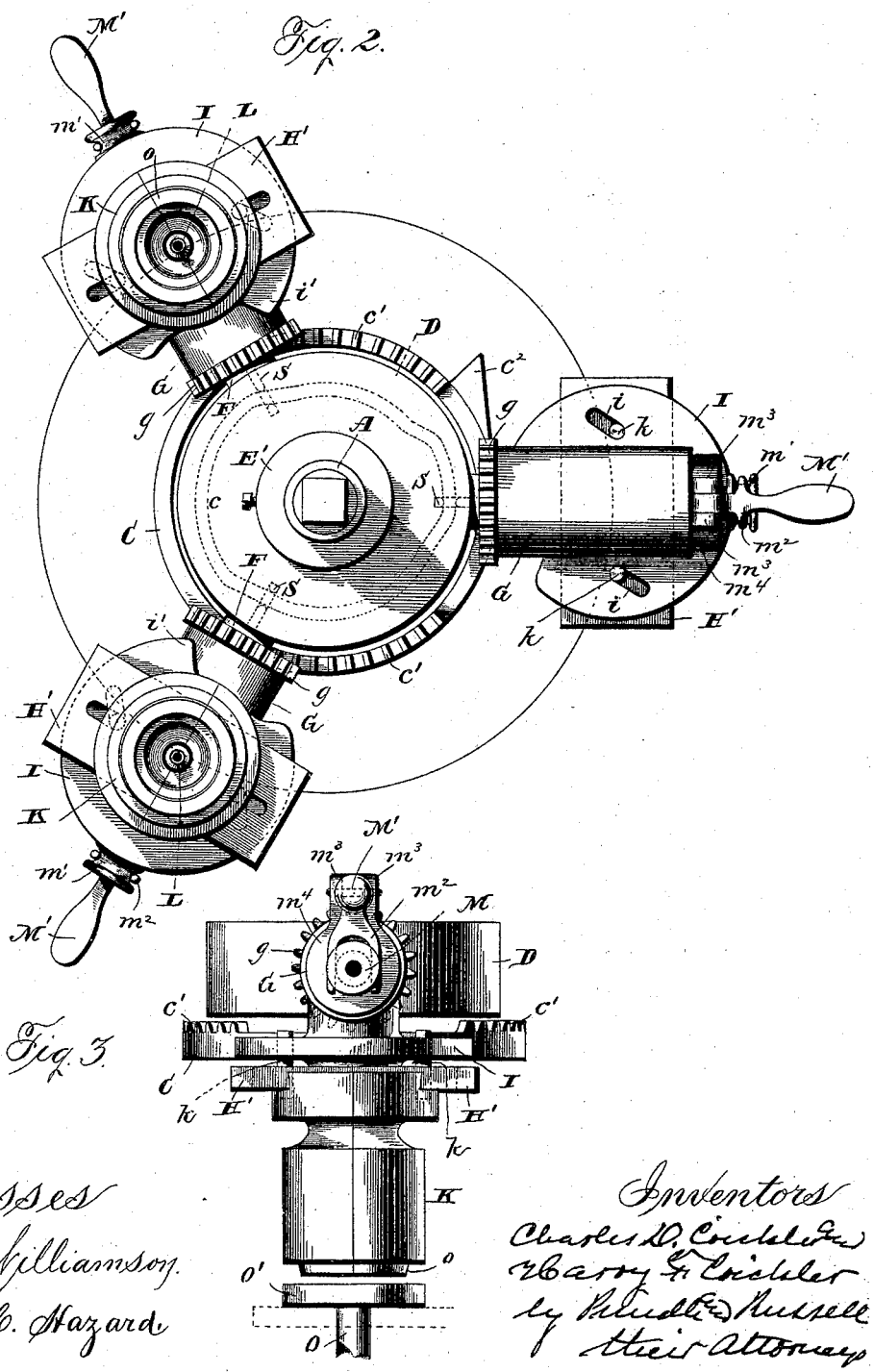

No. 493,984. Patented Mar. 21, 1893.

Witnesses
Chas. J. Williamson.
Henry C. Hazard.

Inventors
Charles D. Crickler
Harry F. Crickler
by Priddle & Russell
their Attorneys

UNITED STATES PATENT OFFICE.

CHARLES D. CRICKLER AND HARRY F. CRICKLER, OF BRIDGETON, NEW JERSEY, ASSIGNORS OF ONE-THIRD TO CLEMENT W. SHOEMAKER, OF SAME PLACE.

APPARATUS FOR MOLDING BOTTLES.

SPECIFICATION forming part of Letters Patent No. 493,984, dated March 21, 1893.

Application filed December 30, 1890. Renewed February 16, 1893. Serial No. 462,610. (No model.)

*To all whom it may concern:*

Be it known that we, CHARLES D. CRICKLER and HARRY F. CRICKLER, of Bridgeton, in the county of Cumberland, and in the State of New Jersey, have invented certain new and useful Improvements in Apparatus for Molding Bottles; and we do hereby declare that the following is a full, clear, and exact description thereof, reference being had to the accompanying drawings, in which—

Figure 4:
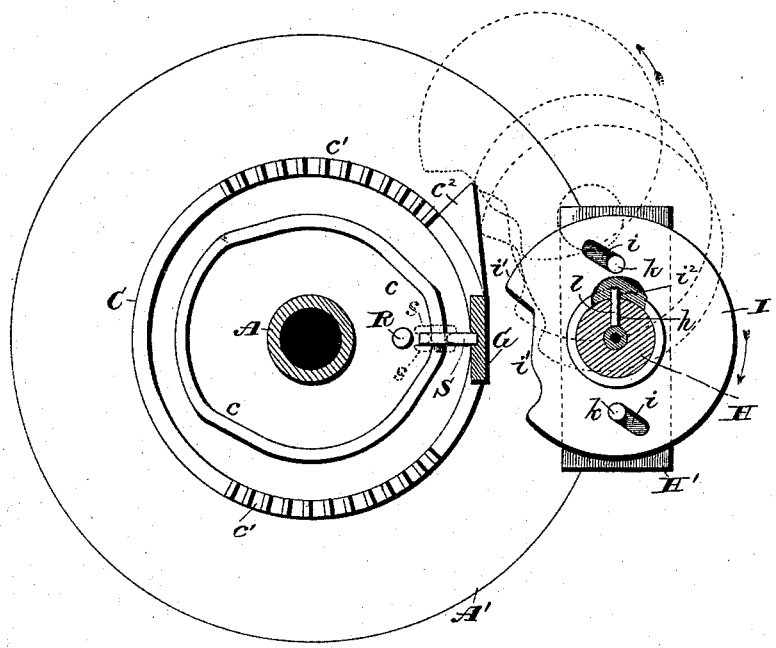
Figure 5:
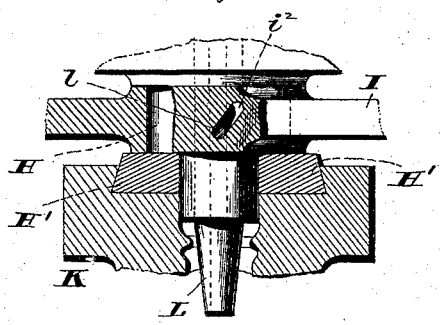

Figure 1 shows a vertical central section of our apparatus with the parts in the positions taken by them just before a molding operation. Fig. 2, is a plan view of the same; Fig. 3, a view in elevation of one of the sets of molding devices with the parts in position, as shown in Fig. 1; Fig. 4, a view of a horizontal section on line $x, x$, of Fig. 1, with only one of the sets of molding devices shown, and Fig. 5, a detail sectional view, showing the means used for guiding and moving the blow tube or nozzle.

Letters of like name and kind refer to like parts in each of the figures.

The object of our invention is to provide an improved apparatus for molding bottles and other hollow ware, and to this end our invention consists, in the machine and in the parts thereof, constructed, arranged, and combined as hereinafter specified.

Our purpose in making the machine, as shown in the drawings and described in the accompanying specification, has been to facilitate the molding of glass bottles, jars, &c., while at the same time making the results produced in the finished article more uniform, than has heretofore been possible, where the molding has been done in the old way by hand. It has also been our intention to make the machine not only capable of rapidly producing the desired articles, but simple in operation, cheap in construction, and not liable to get out of order in any way.

While we shall describe the machine as used for the molding of bottles or jars of glass, we desire it to be understood that it can be well employed in the manufacture of other hollow molded ware of other material than glass.

In the drawings A, designates a hollow standard supported at its lower end by the base A', which can be held or fastened to a floor or other support in any desired way. In communication with the interior of the standard, whose upper and lower ends are shown as closed, is the pipe B to be connected with any suitable source of supply of air under pressure. Attached to the standard, so as to be rigid thereon, is the horizontal disk C having the cam $c$ and the two sets of gear teeth $c', c'$, on its upper face. Journaled upon the standard above such disk is the hollow cylinder D supported from below upon a collar E, or other suitable device, and held down in place by the collar E' fixed upon the standard by the set screw. An opening $a$ puts the interior of the standard into communication with the surrounding chamber D' within the rotary cylinder, so that the compressed air can always flow into the latter. Extending radially outward from the cylinder are the tubular horns F, F, F, preferably, but not necessarily, three in number, having their bores in communication with chamber D'. Journaled upon each horn is a rotary sleeve G having on its inner end the gear teeth $g$ adapted to mesh with the teeth $c', c'$, on the stationary disk C, as the horn is carried around by the rotation of cylinder D about the standard.

The teeth forming the pinion on the sleeve and those in the two sets $c', c'$, on the disk are so arranged relatively, and of such number, that, for each complete turn of the cylinder about the standard, the sleeve will be given a full rotation around its horn. With the parts in position as shown in Fig. 1, the first set of teeth engaged by the sleeve pinion, will turn the latter and its sleeve one half around, and the next set will complete their revolution, bringing the parts attached to the sleeve down into the first position again. So situated on the sleeve, that it will be brought to the upper side of the latter by one half rotation, and to the lower side by the other half turn, is the hollow boss H upon which is journaled the disk I, having the two eccentric slots $i, i$, for a purpose to be described, and the two projections $i' i'$ on its periphery to be alternately engaged by the cam projection $c^2$ on the stationary disk C, so that, as disk I is carried around by the revolution of the cylinder D about the standard, it will be given a partial rotation in one direction, and back again, as indicated in Fig. 4.

Attached to the lower portion of the boss H, is the slotted guide plate H', for supporting the two halves of mold K while allowing them to be moved toward and from each other. For this purpose, the outer sides of the plates are made inclined upward and inward, and engage correspondingly inclined surfaces on the outer sides of grooves in the upper ends of the mold halves. While we have shown and described this special form of guide and support for said halves, we do not limit ourselves thereto, but contemplate using, instead, guides and engaging grooves of different shapes and constructions.

Attached to each half mold and projecting upward therefrom, through the longitudinal slot in the guide H', and into one of the cam slots $i, i$, is a pin or stud $k$. These slots and studs are so arranged that as the disk I is turned forward and back, in the manner indicated hereinbefore, the engaging slots will cause the studs to recede from and approach each other, so that the mold parts will be separated and brought together again.

Within the boss H, with its lower end made tapering and projecting below the boss end into the cavity of the mold, is the blow tube or nozzle L, having a pin $l$ extending through the longitudinal slot $h$ in the boss and into the cam groove $i^2$, in the wheel or rotary disk I. Such groove is so arranged that it will raise the pin and, consequently, the blow tube or nozzle, and lower them again, as the disk is turned forward and back to open and close the mold.

A port $f$, in each horn F, is adapted to admit compressed air from the cylinder D and horn, to the bore of the respective boss H, and the nozzle in the latter, when the sleeve is turned to bring said boss upon its upper side, or below it, as shown in the sectional view in Fig. 1. For regulating the passage of air through such port, we provide the reciprocable hollow valve plug M with closed inner end fitting the bore of the horn, and adapted to close and unclose said port, as it is moved in and out. Another port $m$, in the under side of the plug, communicates with the bore of the latter, and is so situated, as to be brought over the port $f$ by an inward movement of the plug in excess of what is necessary to cause the plug end to close the latter port. For moving the plug in and out, to open and close the ports, as described, we provide the outer end of the plug with a groove $m'$, engaged by the fork $m^2$ of a lever M', which we pivot to suitable ears $m^3, m^3$, on a collar or nut $m^4$, on the end of the respective horn F.

Attached to the standard A, is the arm or bracket carrying a table N, having an opening $n$ for receiving and guiding the stem O on the under side of the movable mold bottom O', adapted to fit and close the lower end of the mold, whose body is made of the two half parts, held and supported as hereinbefore described.

In order to insure a proper centering of the mold bottom and body, and a tight joint between them, the lower end of each half mold is, preferably, provided with a semi-circular rib or flange $o$, to fit a portion of the annular groove $o'$ in the upper face of the bottom.

Pivoted to the table at P, is the lever P' operated by the link $P^2$ connecting it with treadle $P^3$. To the same arm of this lever, are pivotally connected the stem O of the mold bottom, and the sliding bar R which, extending up through and guided in an opening in the table, passes at its upper end up through an opening $c^2$ in the fixed disk C, on the standard A.

In the under side of the rotary cylinder D are the notches or recesses $d, d, d$, each one adapted to be engaged by the upper end of the bar R when the cylinder is turned to bring one of the horns F, F, F, and the mold carried thereby, over the mold bottom O' on the table N. The bar will then, when raised, serve to lock the cylinder and prevent its moving so as to carry the mold body out of proper position during a molding operation. A downward movement of the treadle $P^3$, will cause the lever P' to simultaneously raise the mold bottom up into operative position against the mold halves, and the bar end up into the respective cylinder locking recess $d$. For preventing any rotation of a sleeve G upon its respective horn when it is not being rotated by one of the series of teeth $c', c'$, we provide upon the under side of cylinder D, three radially sliding locks S, S, S, one for each sleeve. Each of such locks is held in suitable radial guides $s, s$, on the cylinder, and has its outer end adapted to enter recess $g'$ or $g^2$, in the inner end of the respective sleeve, when the latter has been turned to bring its boss to a vertical position on its under or upper side respectively. A cam rib or flange C' on the stationary disk C, engages lugs $s', s'$, on each lock S, and is so shaped, as to move the latter outward into locking position each time that the sleeve G has been given a partial rotation by one of the series of teeth $c'$, hold it in such position until just before the next series of teeth is reached by the teeth on the sleeve, and then move it and hold it moved inward during the rotation of the sleeve by said series of teeth. With the two sets or series of teeth $c', c'$, arranged to give each sleeve G, one complete turn for each full rotation of the cylinder D, one set turning said sleeve so as to bring its boss H vertically downward, just before it comes around to the molding tube, or the place where the movable bottom is, and the other set rotating the sleeve to bring the boss and mold around to the upper side thereof, and the cam $c^2$ on the disk C so situated as to be engaged successively by the projections $i', i'$, on the rotary cam disk I, just after the sleeve has been brought past the molding point, the operation of our apparatus is briefly as follows:—

When one of the molds is turned up with the two parts of its body together, a quantity of molten glass sufficient to make one bottle or jar is dropped into it upon the end of the blow tube or nozzle L. The cylinder D is then rotated about the standard A, by hand, or otherwise, until the sleeve G, whose boss carries the charged mold, is turned by the engagement of its gear teeth $g$ with teeth $c'$ on disk C, to bring its boss and mold down over the table upon which is the movable mold bottom. During, or just before the swinging down of the boss and mold body, the valve plug M is moved outward, so as to admit a small quantity of compressed air from cylinder D, through the port $m$, to the blow tube or nozzle. This air is sufficient to expand the glass on the nozzle end within the mold, so that it will not drop out of the latter, when the same is turned down, and before the movable bottom is raised up into place. As the mold reaches its upright position below its carrying sleeve G, the respective lock S is moved outward by the cam rib $C'$ on disk C, engaging its lugs $s'$, $s'$, until its nose enters the recess $g'$ in the sleeve G and locks the latter from turning about its supporting horn F. Just before this locking takes place, the gear teeth $g$, $g$, on the sleeve pass out of engagement with the set of teeth $c'$ on the disk C, which have caused the turning of the sleeve to bring its boss and mold down into molding position. With the sleeve held from rotation about its horn by the respective locks S, as described, the treadle $P^3$ is depressed and the lever $P'$ raises the locking bar R and the mold bottom, the former to engage the locking recess $d$, in the cylinder D, to lock the latter from rotation around the standard, and the latter to close the lower end of the mold body. The locking bar R, now serves to keep the mold fixed in proper position for a molding operation, and, as the cylinder D cannot rotate, the cam $C'$ will hold the lock S positively outward in operative position. The valve operating lever $M'$ is now moved to draw the valve plug M out to entirely uncover the port $f$, and allow the compressed air from standard A, cylinder D and horn F, to flow through the blow tube or nozzle to expand the glass in the mold, so as to make it fit and fill the latter and take the exact configuration of the same. When the molding has been completed, the valve plug is moved inward to close port $f$, and the treadle is raised, lowering the lever arm to which the locking bar R and the mold bottom are connected. A further inward movement of valve plug M brings the port $m$, therein, over port $f$, so that the compressed air can escape from the interior of the formed bottle or jar. The cylinder D being unlocked by the descent of bar R, is rotated by hand or otherwise, to carry the horn F upon which is the sleeve G carrying the mold body and valve mechanism just operated along, so that the cam projection $c^2$ is struck by the forward projection $i'$ on the cam disk I journaled on the sleeve boss, and causes said disk to turn, so that its eccentric slots $i'$, $i$, engaging the lugs $k$, $k$, on the two halves of the mold body, will cam such lugs and, consequently, the two mold halves apart. The molded bottle or jar is then free to drop out, or be removed. To facilitate its removal, the blow tube or nozzle is, by the motion of the cam disk just described above, drawn upward a short distance through the action of the cam groove $i^2$ on the disk, upon the nozzle pin $l$. Further movement of the mold by the rotation of the horn carrying cylinder D, will bring the other projection $i^2$ on the cam disk I, into contact with the cam $c^2$ on the stationary disk C, so that the cam disk will be rotated back to cause its slots $i'$, $i'$, to cam the studs $k$, $k$, and so, the mold halves together again. Before the teeth on the sleeve carrying the mold, come into contact with the teeth on the disk I, which are to rotate it until the mold is turned upward, the sleeve lock S which, up to this time has been held by the cam rib $C'$ with its nose engaging the recess $g'$ in the sleeve end, is drawn inward by said cam rib, so as to release the sleeve and leave it free to turn. Continued rotation of the horn carrying cylinder then causes the sleeve by the engagement of the teeth on the latter with those on the stationary disk, to be rotated to turn the mold body carried by it upward into position to receive another charge of molten glass in the manner first described. Just as the sleeve teeth pass out of engagement with those on the disk, the projecting part of the cam rib $C'$ on the latter moves the lock S out again, so that its nose enters the second locking notch or recess $g^2$ which is situated on the sleeve diametrically opposite to $g'$. This projecting part of the cam rib continues around far enough to hold the lock in position for locking the sleeve, until, by the movement of cylinder D, the sleeve teeth reach the teeth on the cam disk which are to turn the sleeve to bring its mold down into molding position again. As each mold body is inverted after it has passed the molding point and remains held by its respective lock S in that position, until it is turned down again by the engagement of the teeth on its respective sleeve G with the series of teeth on the stationary disk, each mold can be given its charge of molten glass, while the cylinder is held stationary for the carrying out of a molding operation in one of the other molds. Each time that the cam disk I is turned to close the halves of its respective mold together, the nozzle or blow tube K, whose pin $k$ engages the groove $L^2$ in said disk, will, obviously, be forced down into operative position in the mold neck. While we have shown and described three sets of molding devices carried on three horns situated at equally distant points on the cylinder D, we do not limit ourselves to such number. The cylinder can be provided with a greater or less number of the horns with attached operative devices without involving any departure from our invention. We prefer, however, the arrangement and construction shown and described, as being most convenient for use.

Our machine, constructed and arranged for operation, as set forth, is, while simple, cheap and not liable to get out of order, capable of being easily and rapidly operated and of producing the most uniform results in the finished articles formed by it.

Having thus described our invention, what we claim is—

1. In a bottle molding apparatus in combination with the mold and a support therefor, the movable blow tube or nozzle projecting into the neck of the mold, a pin on the tube or nozzle, a guide piece for the latter having a longitudinal slot through which the pin projects, and a rotary cam having a cam groove engaging the pin, substantially as and for the purpose shown.

2. In a bottle molding machine in combination with the mold having its body divided into several parts each provided with a pin or stud, and a support for the mold parts adapted to allow them to be moved to and from each other, the reciprocable blow tube or nozzle projecting into the mold neck, a guide for the tube, a pin or stud on the latter, and a rotary piece having cam grooves to engage the pins or studs on the mold parts and the tube, substantially as and for the purpose set forth.

3. In a bottle molding machine in combination with a hollow boss provided with a longitudinal slot, a mold having its body divided into several parts each provided with a pin or stud, supports for the mold parts on the boss adapted to allow such parts to be moved to and from each other, the blow tube or nozzle within the boss, having a pin projecting through the longitudinal slot in the latter, and a rotary disk on the boss having a cam groove engaging said pin, and eccentric slots engaging the pins or studs on the mold parts, substantially as and for the purpose described.

4. In a bottle molding machine, in combination with a movable support, a mold divided into several parts supported from said support, so as to be capable of movement to and from each other, the cam for opening and closing the mold, also carried by the movable support, and a stationary cam projection to move the mold operating cam in opposite directions, as it passes the projection, substantially as and for the purpose specified.

5. In a bottle molding machine, in combination with the divided mold and the movable support therefor, the rotary cam piece for opening and closing the mold having two cam projections, and the stationary cam projection to engage the latter, substantially as and for the purpose shown.

6. In a bottle molding machine, in combination with a movable support and the mold supported therefrom having its body divided into several parts made movable to and from each other, and each provided with a stud or pin, a stationary cam projection and a rotary cam piece having cam slots engaging the studs on the mold parts, and two projections to engage the stationary cam projection, so as to cause turning of the cam piece first in one direction and then in the other, as the mold support moves along, substantially as and for the purpose set forth.

7. In a bottle molding machine, in combination with a movable support or carrier, and the mold carried thereby, the blow tube or nozzle on the support or carrier, having its end adapted to project down into the neck of the mold, a cam device for reciprocating the nozzle, also carried by the movable support or carrier, and a cam projection on a stationary support to move the cam device first in one direction and then in the other as the carrier moves along, substantially as and for the purpose described.

8. In a bottle molding machine, in combination with a movable support or carrier, and the divided mold having the parts of its body made movable with reference to each other, the reciprocable blow tube or nozzle, also, on the support or carrier, a rotary cam device having cam connections between it and the mold parts and the nozzle so as to close the mold and move the nozzle down into the neck of the same, and to open the mold and withdraw the nozzle as the cam device is turned in one direction or the other, and two cam projections, a stationary cam to engage such projections, as the carrier or support is moved along, substantially as and for the purpose specified.

9. In a bottle molding machine, in combination with the mold and the rotary carrier to which the mold is attached so as to be inverted and turned back into upright position as the carrier revolves, a movable device upon which the mold carrier is journaled, gear teeth on the mold carrier, and teeth on a stationary piece to mesh with those on the carrier, substantially as and for the purpose shown.

10. In a bottle molding machine, in combination with a movable arm or horn, and a sleeve journaled thereon provided with gear teeth, the mold carried by the sleeve, and a stationary piece with series of teeth, each series being adapted to engage the teeth on the sleeve and give the latter a partial turn, as it moves along, substantially as and for the purpose set forth.

11. In a bottle molding machine, in combination with a movable arm or horn, and the sleeve journaled thereon provided with gear teeth, the mold carried by the sleeve, a stationary piece provided with series of teeth to engage those on the sleeve, and turn the latter, as it is moved along, and locking devices to lock the sleeve when its teeth are not meshing with those on the stationary piece, substantially as and for the purpose described.

12. In a bottle molding machine, in combination with a movable arm or horn, and the sleeve journaled thereon provided with gear teeth, and a locking notch, a stationary piece provided with teeth to mesh with those on the sleeve, and a lock to engage the recess in the sleeve and lock the latter from turning on its supporting arm or horn, when the sleeve teeth are not meshing with those on the stationary piece, substantially as specified.

13. In a bottle molding machine, in combination with the mold, a movable horn or arm, the mold supporting sleeve journaled thereon provided with gear teeth and a locking notch, teeth on a stationary piece to engage those on the sleeve, a lock to engage the locking recess in the sleeve when the latter has been turned to bring the mold down into operative position and a cam to actuate such lock as the mold supporting lever is moved along, substantially as and for the purpose set forth.

14. In a bottle molding machine, in combination with the mold, a movable arm or horn, the mold supporting sleeve journaled thereon, provided with the gear teeth and the two locking notches, or recesses, the lock to engage the latter, and a stationary piece provided with two series of teeth, each series being adapted to mesh with the sleeve teeth, and give the sleeve a half turn as it moves along, and with a cam to move the lock into operative position to lock the sleeve when its gear teeth are out of engagement with those on the stationary piece, substantially as and for the purpose shown.

15. In a bottle molding machine, in combination with the rotary cylinder and a horn thereon, the sleeve journaled on the latter and provided with gear teeth, a stationary piece having teeth to mesh with those on the sleeve and the mold supported from the latter, substantially as and for the purpose set forth.

16. In a bottle molding machine, in combination with a rotary cylinder and a horn thereon, the sleeve journaled upon the horn and provided with gear teeth, the mold supported from the sleeve, a lock on the cylinder adapted to engage a locking recess in the sleeve, and a stationary piece having teeth to engage the teeth on the sleeve, and the cam for moving the lock into and out of position to lock the sleeve from rotating when the teeth on the latter are not meshing with those on the stationary piece, substantially as and for the purpose described.

17. In a bottle molding machine, in combination with the rotary cylinder and a horn thereon, the sleeve journaled on the horn provided with gear teeth, the divided mold having the parts of its body supported on the sleeve, so as to be movable to and from each other, the cam for opening and closing the mold also supported from the sleeve, and a stationary piece provided with teeth to engage those on the sleeve, and engaging cam devices on the stationary piece, and the mold closing cam, whereby the cam will be turned first in one direction and then the other, substantially as and for the purpose specified.

18. In a bottle molding machine, in combination with the rotary cylinder and the horn thereon, a sleeve journaled on the horn, and provided with gear teeth, the divided mold having the parts of its body movably supported from the sleeve, the cam disk journaled on a part of the sleeve and having the two cam projections, cam connections between the disk and the mold parts to open and close the mold as the disk is moved in one direction or the other, and a stationary piece having teeth to engage those on the sleeve, and a cam projection to engage the projections on the disk, substantially as and for the purpose shown.

19. In a bottle molding machine, in combination with a supporting tubular horn to be connected with a source of supply of compressed air, the sleeve journaled thereon, the mold and the blow tube or nozzle carried by the sleeve, and suitable ports or passages in the horn and sleeve to put the tube or nozzle in communication with the bore of the horn, substantially as and for the purpose set forth.

20. In a bottle molding machine, in combination with a tubular horn and a sleeve journaled thereon, the mold and blow tube or nozzle carried by the sleeve, a port in the horn for admitting air from the latter to the nozzle, and a valve to regulate the passage of air through such port, substantially as and for the purpose described.

21. In a bottle molding machine, in combination with a tubular standard, the hollow cylinder having its interior in communication with that of the standard, a tubular horn on the cylinder, the mold supported from the horn, a blow tube or nozzle, a port in the horn to communicate with the bore of the tube or nozzle, and a suitable valve to open and close such port, substantially as set forth.

22. In a bottle molding machine, in combination with the hollow cylinder and the tubular standard upon which the cylinder is supported, having its bore in communication with the interior of the cylinder, the tubular horn on the cylinder, the mold supported from the horn, the blow tube or nozzle, a port in the horn to communicate with the tube or nozzle bore, and a valve adapted to open and close the port and to put it into communication with the atmosphere, substantially as and for the purpose described.

23. In a bottle molding machine, in combination with a tubular horn to be connected with a source of supply of compressed air, and the blow tube or nozzle, a port in the horn to communicate with the tube or nozzle, and a reciprocating valve in the horn consisting of a plug adapted to be moved over and caused to close the port, and itself having an exhaust passage communicating with the atmosphere, and a port opening into such passage, adapted to be brought over the port in the horn by a movement of the plug beyond what is necessary to cause its end to close the latter port, substantially as and for the purpose specified.

24. In a bottle molding machine, in combination with the blow tube or nozzle and the tubular horn provided with a port to admit compressed air to the former, the reciprocating valve plug for opening and closing the port in the horn, having the exhaust passage and the port communicating therewith, the valve operating lever supported from the horn and engaging the valve plug so as to actuate the same as the lever is moved, substantially as and for the purpose shown.

25. In a bottle molding machine, in combination with a movable piece carrying several mold bodies, a suitable table or support, a movable mold bottom over which the mold bodies are carried, and means for raising such bottom up to close the bottom of any one of the mold bodies brought over it by the motion of the carrying piece, substantially as and for the purpose set forth.

26. In a bottle molding machine, in combination with two or more mold bodies and a movable carrying piece for supporting the same, a suitable table or support, a movable mold bottom, not carried by the mold body carrying piece means for raising the latter up against any of the mold bodies brought over it by the movement of the carrying piece, and a lock for holding such piece when the mold bottom is raised, substantially as and for the purpose described.

27. In a bottle molding machine, in combination with a suitable moving carrier for them, two or more mold bodies, a mold bottom over which the bodies will be carried by the movement of their carrier, a lever for raising the bottom up against any of the mold bodies which may be brought over it, and a lock connected with the lever and locking recesses in the carrier so situated that each one will be in position to be engaged by the bar as a mold body is brought over the mold bottom, substantially as and for the purpose specified.

28. In a bottle molding machine, in combination with two or more mold bodies and the rotary cylinder by which the latter are carried, provided with a locking recess for each mold, a movable mold bottom adapted to be raised up against any mold body brought over it by rotation of the cylinder, the lever for raising such bottom, and the cylinder locking bar connected with the lever, substantially as and for the purpose shown.

29. In a bottle molding machine in combination with the rotary cylinder provided with two or more horns, the sleeves journaled on the latter each having gear teeth, mold bodies supported from the sleeves, locking devices on the cylinder for the respective sleeves, and a stationary disk having the two series of teeth with each series adapted to give a sleeve a part revolution, and a cam engaging the sleeve locking devices so as to cause each one to lock its respective sleeve when the latter has been turned by the gear teeth on the disk to bring its attached body into upright position above or beneath it, substantially as and for the purpose set forth.

In testimony that we claim the foregoing we have hereunto set our hands this 20th day of November, 1890.

CHARLES D. CRICKLER.
  HARRY F. CRICKLER.

Witnesses:
 JAMES J. REEVES,
 P. KENNEDY REEVES.